(12) United States Patent
Seifert et al.

(10) Patent No.: US 6,877,799 B2
(45) Date of Patent: Apr. 12, 2005

(54) OPENABLE MOTOR VEHICLE ROOF

(75) Inventors: Wolfgang Seifert, Wielenbach (DE); Francois De Gaillard, Mouilleron en pareds (FR); Bernhard Wingen, Feldkirchen-Westerham (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/361,832

(22) Filed: Feb. 11, 2003

(65) Prior Publication Data

US 2003/0184128 A1 Oct. 2, 2003

(30) Foreign Application Priority Data

Feb. 11, 2002 (DE) .......................................... 102 05 612

(51) Int. Cl.[7] .............................................. B60J 7/047
(52) U.S. Cl. ................................................. 296/216.03
(58) Field of Search ........................ 296/216.03, 220.01

(56) References Cited

U.S. PATENT DOCUMENTS

| | | |
|---|---|---|
| 4,602,815 A | 7/1986 | Boots et al. |
| 4,746,165 A | 5/1988 | Fuerst et al. |
| 5,335,961 A | 8/1994 | Reinsch et al. |
| 5,447,355 A | 9/1995 | Kelm |
| 5,484,185 A | 1/1996 | Salz et al. |
| 5,730,487 A | 3/1998 | Hausrath |
| 5,971,473 A | 10/1999 | Kelm |
| 6,550,853 B2 * | 4/2003 | Wingen et al. ........ 296/216.03 |
| 6,572,183 B2 * | 6/2003 | Wingen et al. ........ 296/216.03 |

FOREIGN PATENT DOCUMENTS

| | | |
|---|---|---|
| DE | 33 45 122 C2 | 7/1984 |
| DE | 298 22 016 U1 | 12/1999 |
| DE | 100 09 387 C1 | 5/2001 |

* cited by examiner

*Primary Examiner*—Dennis H. Pedder
(74) *Attorney, Agent, or Firm*—Nixon Peabody LLP; David S. Safran

(57) ABSTRACT

An openable motor vehicle roof, which is provided with at least one cover (10, 110) which, in the closed position, closes at least part of a roof opening (46), with a carriage (36, 136) which can be moved in the lengthwise direction of the roof in a first roof-mounted guide (38) by a drive, and with a cover-mounted cover carrier (12, 112) which is movably guided in the lengthwise direction of the roof by a first sliding element (16, 116) in a second roof-mounted guide (20) and by a second sliding element (18, 118) which is offset to the rear relative to the first sliding element in the third roof-mounted guide (22). The cover can be raised at its rear edge by displacement of the carriage to the rear and can be pushed to the rear with the rear edge of the cover raised to clear the roof opening. The cover carrier (12, 112) is provided with a first guide path (30, 130) into which the carriage (36, 136) fits by means of a first engagement element (32, 132) and which is made such that, proceeding from the closed position, the displacement of the carriage, and thus of the first engagement element, to the rear causes the raising motion of the rear edge of the cover.

19 Claims, 8 Drawing Sheets

US 6,877,799 B2

OPENABLE MOTOR VEHICLE ROOF

BACKGROUND OF THE INVENTION

1. Field of the Invention

This invention relates to an openable motor vehicle roof with at least one cover which, in the closed position, closes at least part of a roof opening, with a carriage which can be moved in the lengthwise direction of the roof in a first roof-mounted guide by means of a drive, and with a cover-mounted cover carrier which is movably guided in the lengthwise direction of the roof by means of a first sliding element in a second roof-mounted guide and by means of a second sliding element which is offset to the rear relative to the first sliding element in a third roof-mounted guide, the cover being raisable at its rear edge by displacement of the carriage to the rear and can be pushed to the rear with the rear edge of the cover raised to clear a roof opening.

2. Description of Related Art

A motor vehicle roof of the initially mentioned type is known, for example, from German Patent DE 33 45 122 C2 and corresponding U.S. Pat. No. 4,602,815, this roof being a spoiler roof, i.e., the first and the second guideway being made such that the cover can be raised at its rear edge from the closed position, and in this raised position, can be pushed rearward to clear the roof opening. The first and the second guideway are made as guide slots in a roof-mounted member and are located in succession in the lengthwise direction of the roof, a cover-mounted guide pin fitting into the guide slots. In the area of the front guide pin, there is a slide block which is driven by the drive cable and which fits into a roof-mounted guide rail which is located opposite the roof-mounted guide member. The disadvantage in this structure is that a raising motion of the cover can only be achieved in conjunction with displacement of the cover so that when the guide paths are configured such that slow raising of the cover takes place, the front edge of the cover is separated from the front seal long before reaching the raised position, or, on the other hand, when this position is reached, raising motion can be achieved only very quickly, i.e. by very steep guide paths.

SUMMARY OF THE INVENTION

The primary object of this invention is to devise an openable motor vehicle roof in which it is possible to maintain a connection of the front edge of the cover to the front seal during raising of the cover, and moreover, to achieve a slow raising motion.

This object is achieved by a cover carrier being provided with a first guide path into which the carriage fits by means of a first engagement element and which is made such that, proceeding from the closed position, the displacement of the carriage, and thus of the first engagement element, to the rear causes the raising motion of the rear edge of the cover.

In this approach in accordance with the invention, it is advantageous to enable decoupling of the displacement motion and the raising motion of the cover at the start of the opening motion by providing a guide path in the cover carrier into which the driven carriage fits. In this way, for example, without significant displacement motion of the cover, a raising motion that is as slow as desired can be achieved by the corresponding configuration of the guide path of the cover carrier. As a result, it is possible to keep the front edge of the cover essentially stationary during the raising motion of the rear edge of the cover.

The an embodiment of the invention is explained in detail below with reference to the accompanying drawings.

DETAILED DESCRIPTION OF THE INVENTION

Figure 1:
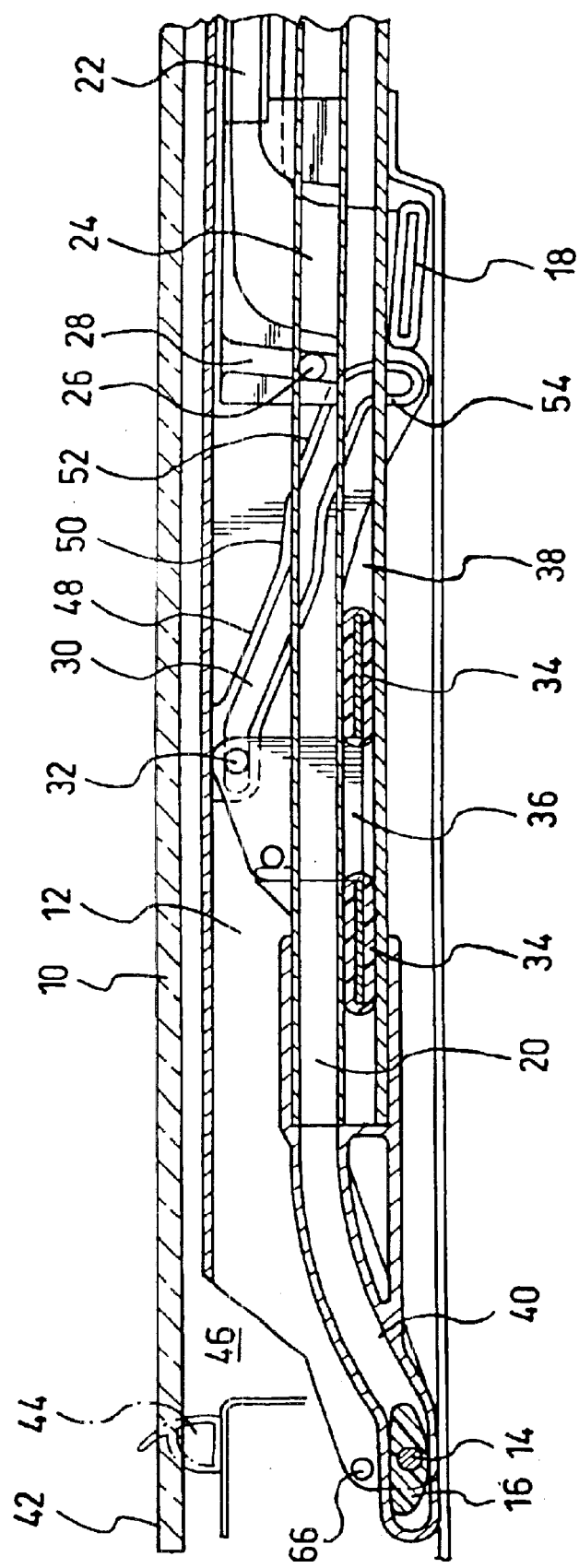
FIG. 1 is a side cross-sectional view of a portion of the front cover of the motor vehicle roof in accordance with the invention in the closed position.

FIG. 1 shows the front cover 10 of a so-called double spoiler roof in the closed position. A cover carrier 12 is attached to the cover 10 and on its front end bears a slide block 16 which can be pivoted around the axis 14, and in its middle section, bears a rear slide block 18 which is stationary with respect to the cover carrier 12. The front slide block 16 is guided in a guide channel 20, while the rear slide block 18 is designed for guidance in the guide channel 22, however, in the closed position shown in FIG. 1, the rear slide block 18 the still underneath an initial area 24 of the guide channel 22. Furthermore, on the cover carrier 12, a pin 26 is provided which, in the closed position shown in FIG. 1, fits into an almost vertically running, i.e., very steeply running, roof-mounted guide path 28 which is open on the top and bottom ends. In the middle area, the cover carrier 12 is provided with a guide path 30 into which a guide pin 32 fits. Guide pin 32 is provided on a carriage 36 which is movably guided by means of two slide blocks 34 in a guide channel 38 in the lengthwise direction of the roof and which is driven by a drive cable (not shown). In the closed position shown in FIG. 1, the guide pin 32 is in the essentially horizontally running front end area of the guide path 30 which is used for equalizing the production and installation tolerances.

Figure 8:
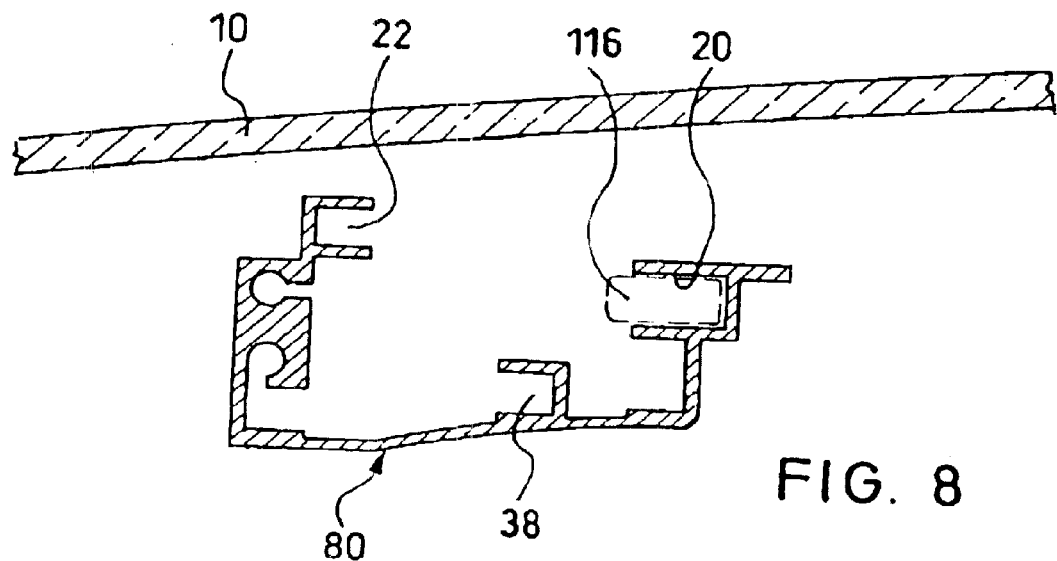
FIG. 8 is a transverse sectional view of the guide rail taken along the section line VIII—VIII in FIG. 3.

The guide channels 20, 22 and 38 are made as shown in FIG. 8 in a common roof-mounted guide rail 80 which is essentially U-shaped, the guide channels 20, 22 being made on the inside of two opposed, upstanding side legs of the U shape guide rail 80, while the guide channel 38 for the slide block 34 of the carriage 36 is made on the bottom wall area of the guide rail. The two guide channels 20, 22 run, aside from their initial areas 40, 24, essentially horizontally. The guide channel 38 runs over its entire length essentially horizontally. The initial areas 40, 24 of guide channels 20, 22 are made preferably as inserts or attachments to the guide rail. In the closed position shown in FIG. 1, the front slide block 16 is in the essentially horizontally running end area of the insert 40. Overall, the guideway for the front slide block 16 is somewhat S-shaped in the initial area 40.

The front end 42 of the cover 10 adjoins the front seal 44 of the roof opening 46, compressing it from its normal position shown in dot-dash lines in the drawings.

Figure 2:
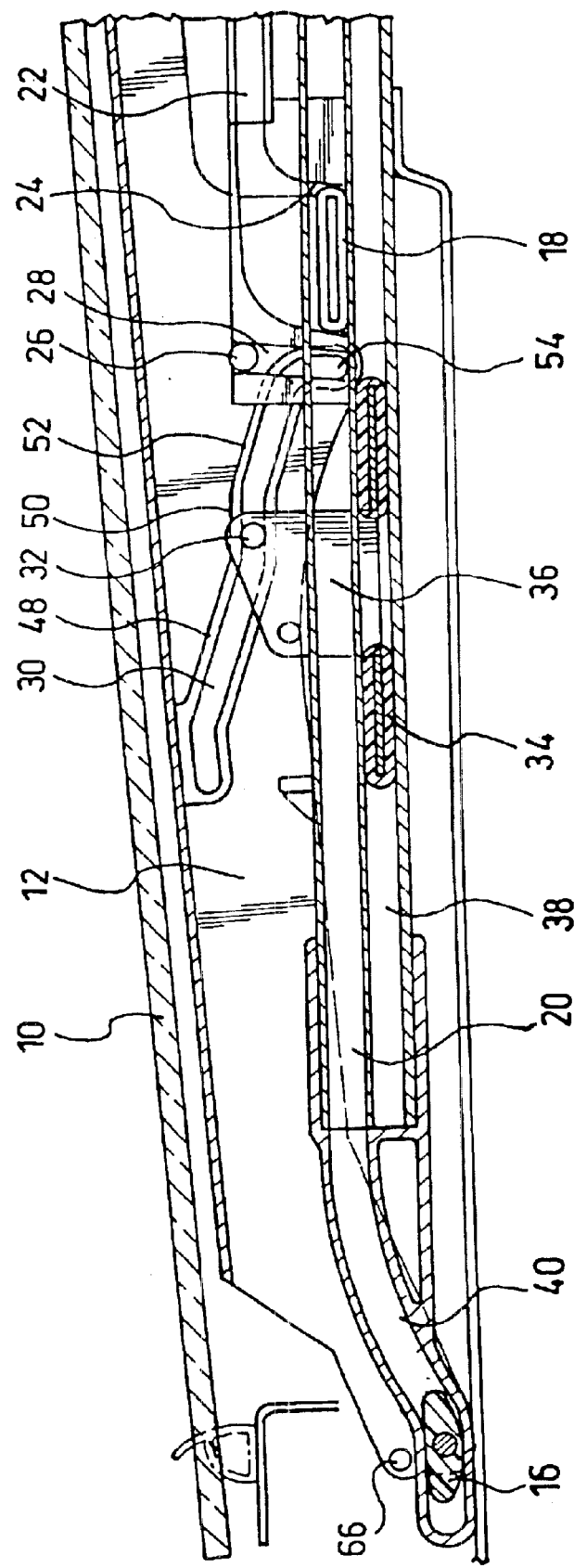
FIG. 2 is a view like that of FIG. 1, but showing the cover partially raised.

Moving the carriage 36 to the rear in a conventional manner by means of the drive cable driven by a drive motor moves the front cover 10 into the intermediate position shown in FIG. 2 and in which the rear edge of the cover is raised by the displacement of the guide pin 32 in the guide path 30 of the cover carrier 12 with respect to the front end 42. The guide pin 32 is located in the position shown in FIG. 2 after traversing a uniformly declining segment 48 into the horizontal segment 50 which is used to equalize production and installation tolerances. Due to the raising motion which is caused thereby, the pin 26 in the roof-mounted guide path 28 is moved up toward its open end. However, since it is still engaged to the guide path 28, displacement of the cover carrier 12 to the rear is essentially prevented so that the front end 42 of the cover 10 still adjoins the front seal 44, forming a seal in order to prevent excess development of wind noise. The rear slide block 18 was likewise raised accordingly and has now entered the initial area 24 of the guide channel 22 which leads very steeply upward. The front slide block 16 is still located in the horizontal initial area of the guide channel 20.

Figure 3:
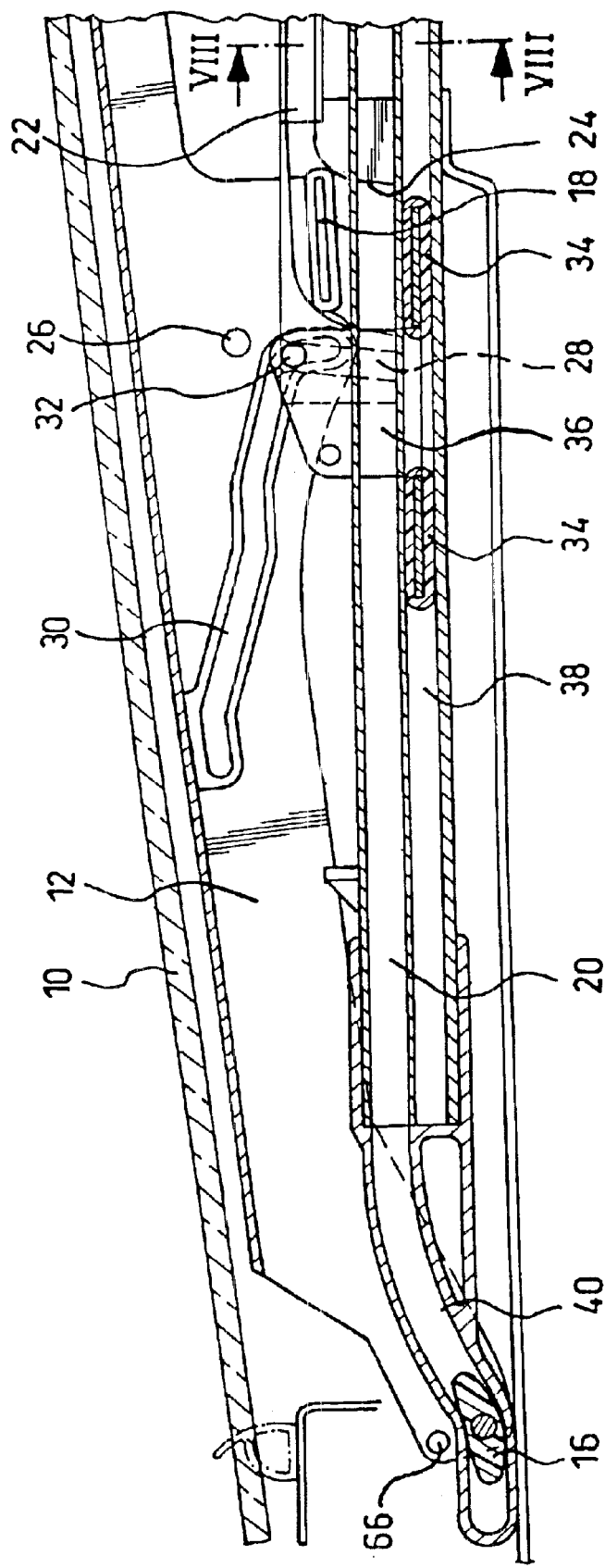
FIG. 3 is a view like that of FIG. 1, but showing the cover almost completely raised.

In the intermediate position shown in FIG. 3, the guide pin 32, after traversing the inclined segment 52 of the guide slot 30, which runs uniformly downward, reaches the back end segment 54 of the guide slot 30 which leads almost vertically down. Due to the raising motion of the rear edge of the cover which is continued by traversing the inclined segment 52, the pin 26 has emerged from the upper end of the guide path 28 and thus has ended its interlocking function. Upon emergence from the guide path 28, the interlocking function with respect to premature displacement motion of the cover 10 is transferred to the part of the initial segment of the guide channel 22 which leads very steeply upward.

FIG. 3 shows the cover position in which the raising function of the guide path 30 is transferred to the guide channel 22, i.e., the shaping of the initial area 24 via the engagement of the rear slide block 18 provides for a further raising motion of the cover 10. The engagement of the guide pin 32 in the almost vertical end section 54 of the guide path 30 is used essentially to entrain the cover carrier 12 to the rear. The front slide block 16 and the front edge 42 of the cover, during the raising motion of the cover 10, are kept essentially stationary in the lengthwise direction of the roof by the very steep rise of the guide path 28 and of the initial area 24 of the guide channel 11 so that the location of the guide path 28 and of the initial area 24 determines the location of the front edge 42 of the cover in the raising motion.

In the position shown in FIG. 3, the cover 10 is already almost completely raised.

Figure 4:
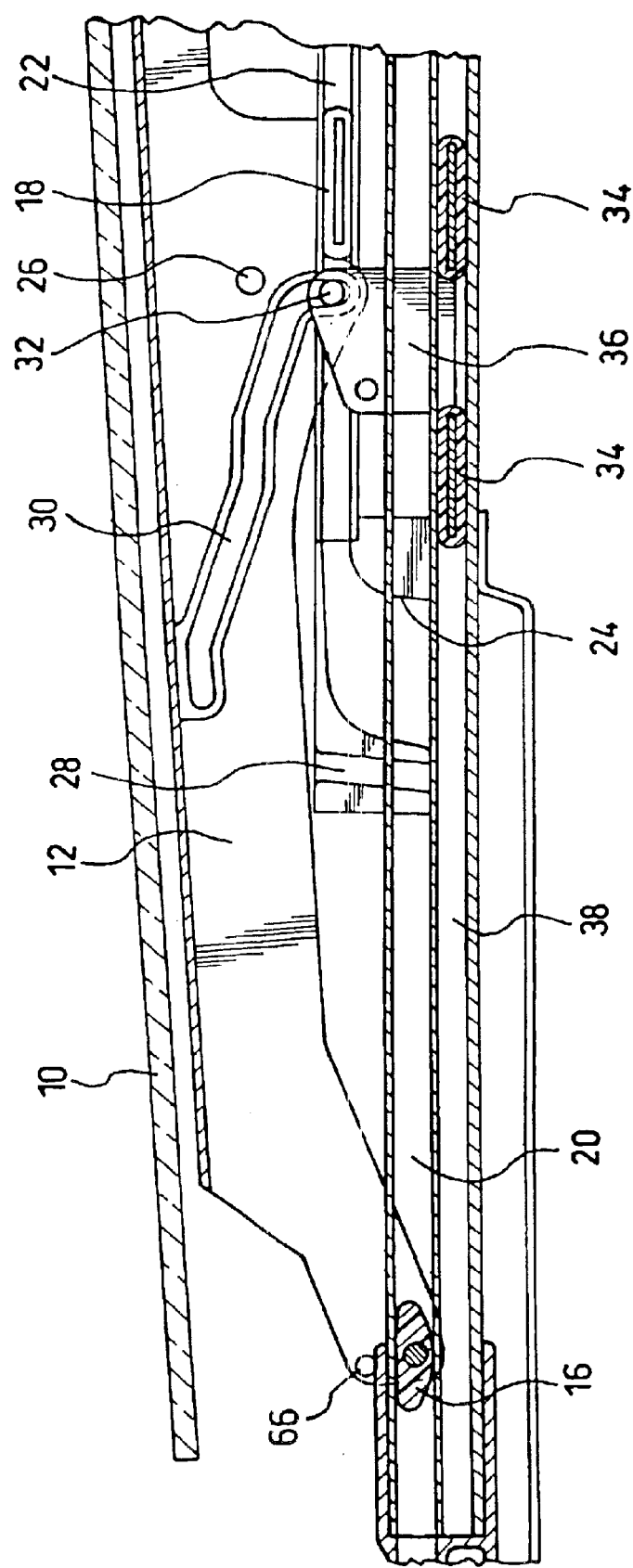
FIG. 4 is a view like that of FIG. 1, but showing the cover completely raised.

Finally, FIG. 4 shows the position of the front cover 10 in which it is completely raised and has already been pushed a distance to the rear. The rear slide block 18 is now located in the horizontal section of the guide channel 22 and the guide pin 32 is located on the rear or lower end of the almost vertical segment 54 of the guide path 30. The latter ensures entrainment of the cover carrier 12 by the carriage 36 to the rear. The frictional connection also acts in the closing direction. The front slide block 16 has now traversed the ascending area of the guide channel 20 and is located in the upper horizonal part so that, now, the front edge of the cover is likewise raised, but to an essentially smaller degree than the rear edge of the cover. By further shifting the carriage 36 to the rear, the cover 10 can be moved into its completely opened position. When the cover 10 is closed, the indicated processes proceed in the reverse sequence.

Figure 5:
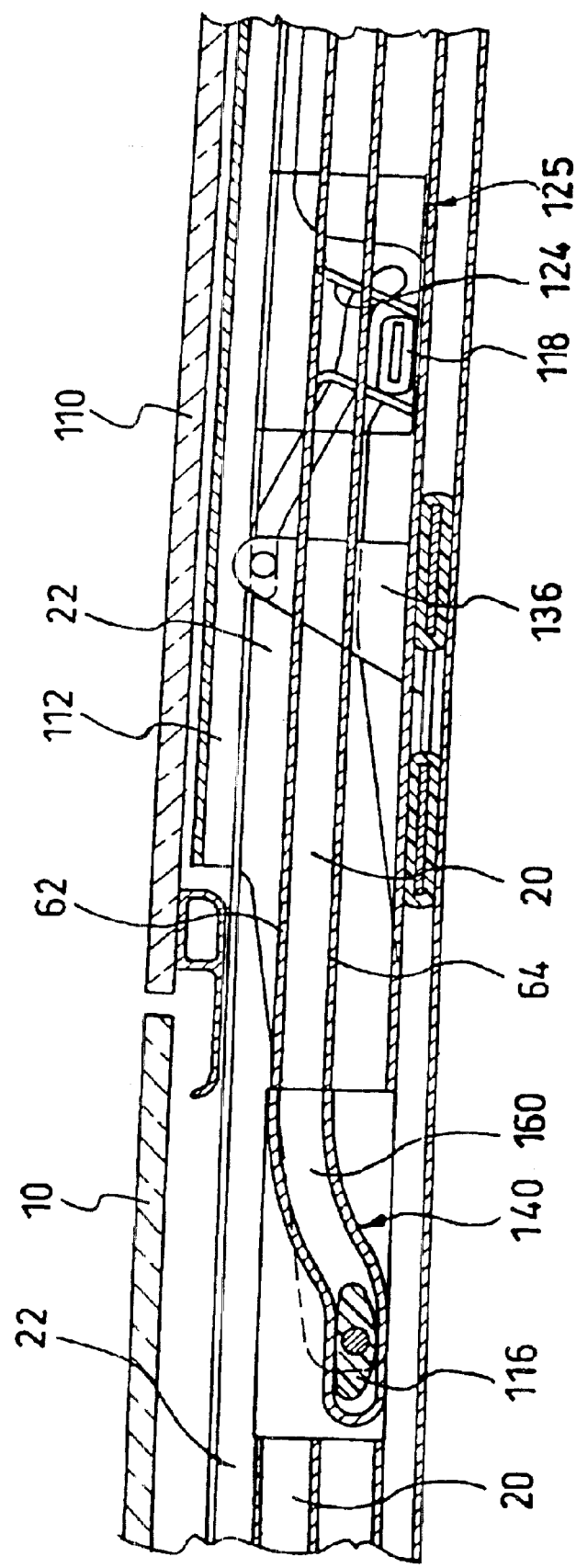
FIG. 5 is a side cross-sectional view of adjoining portions of the front and rear covers of the motor vehicle roof in accordance with the invention in the closed position.

FIG. 5 shows the rear cover 110 of a double spoiler roof which lies in the closed position flat behind the front cover 10 in order to jointly cover the roof opening 46. The front cover 10 corresponds functionally to the cover shown in FIGS. 1 to 4, except for the fact that the rear slide block 18, instead of being located behind the back end of the guide path 30 as in FIGS. 1 to 4, is located in front of the back end of the guide path 30. The rear cover 110 is built essentially analogously to the front cover 10. The same or similar parts are provided with a reference number increased by 100. However, one difference is that the rear slide block 118 is shorter than the front slide block 18, the steep initial area 124 of the guideway 122 being narrower than the initial area 24 of the rear slide block 18 of the front cover 10. The guide channel 22 is used both by the rear slider 18 of the front cover 10 and also the rear slider 118 of the rear cover 110. With the covers 10, 110 completely pushed back, the slider 18 of the front cover 10 can travel into the area of the guideway 22 to behind the initial area 124. In order to prevent the slide block 18 of the front cover 10 from unwantedly entering the steep initial area 124 for the slide block 118, the slide block 18, as mentioned above, is much longer than the slide block 118 of the rear cover 110. The area in which the steep initial area 124 branches from the guide channel 22 is made as an insertion or attachment part 125.

The guideway 20 is also used by both the rear slide block 16 of the front cover 10 and the front slide block 116 of the rear cover 110. Therefore, here, there is a branching area 140 which is made as an insertion part. In the branching area 140, a secondary path 160 is branched down out of the jointly used main path 20 and forms the initial area of the guideway for the front slide block 116. The switch function of the branching area 140 can take place either as in the case of the rear slide block 18, 118 by the different lengthwise extension of the two slide blocks 16, 116, or by providing an additional sliding element near the front slide block 16 of the front cover 10 in the manner described below.

In the slide block 18 of the front cover carrier 12, there is an additional sliding element 66 which is arranged and made such that it adjoins the top of the upper side wall 62 in the branching area 140, and in doing so, interacts with the slide block 18 in order to guide the slide block 18 along the inside of the upper side wall 62 in the main path 20, and thus, to prevent the slide block 18 from entering the secondary path 160 in the branching area. This is done, in this example, by the wall thickness of the upper side wall 62 being increased in the area of the branching insert 140 so that in this area the upper sliding element 66 adjoins the outside of the top side wall 62, while the slide block 18 adjoins the inside of the upper side wall 62. Outside of the branching insert 140, the wall thickness of the upper side wall 62 is reduced such that the top sliding element 66 no longer adjoins the outside of the upper side wall 62, and thus, overdetermination of guidance is prevented since, in this area, the inside of the lower side wall 64 will provide for corresponding guidance in the vertical direction, i.e., outside of the branching insert 140, the slide block 18 will be guided in the conventional manner by the two side walls 62, 64 of the guide channel 20. The indicated action of the upper sliding element 66 in the area of the branching area 140 thus prevents the slide block 18, when it passes the branching of the secondary path 160 downward, from dropping down and entering the secondary path 160.

Figure 9:
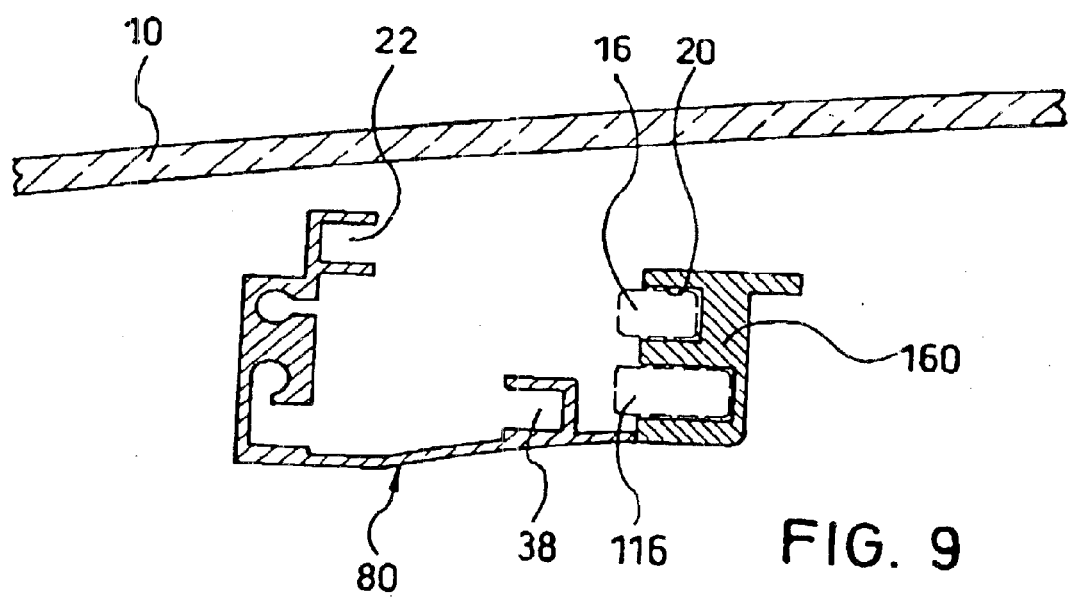
FIG. 9 is a transverse sectional view of the guide rail taken along the section line IX—IX in FIG. 5.

Guidance of the front slide block 116 of the rear cover 110 when passing the branching site in the vertical direction is achieved by the depth, i.e., the extension in the transverse roof direction, of the main path 20 being reduced with respect to the depth of the secondary path 160, as is apparent in FIG. 9 (the slide blocks 18 and 116 are shown by the broken line in FIGS. 8 and 9). The width (i.e., the extension in the transverse roof direction) of the slide block 18 of the front cover 10 is selected according to the depth of the main path 20 in the branching insert 140, while the width of the slide block 116 of the rear cover 110 is selected according to the depth of the secondary path 160, i.e., to be accordingly larger. These different widths of the slide blocks 18, 116 result in the slide block 18 of the front cover 10 being able to pass the branching area 140 by the action of the upper sliding element 66 on the main path 20, while the slide block 116 of the rear cover 110 due to its greater width enters the secondary path 160 and is guided down in the latter. In the rear part of the main path 20, its depth corresponds to the depth of the secondary path 160 so that this part can be used jointly by the two slide blocks 18, 116. The two slide blocks 18, 116 have essentially the same length (i.e., the dimension in the lengthwise direction of the roof), by which for the slide block 18 of the front cover 10 narrow radii of curvature in the front end area of the front part 40 of the main path 20 are also possible (this front end area can thus be made in a similar shape as the secondary path 160 for the slide block 116 of the rear cover 110).

Another important difference from the front cover 10 is that, for the rear cover 110, there is no interlocking pin analogous to the pin 26 to prevent displacement of the cover at the start of the raising motion, since the rear cover 110 has a lower raising height. The guide path 132 is also made slightly divergent by the second uniformly descending area 52 being essentially omitted.

Figure 6:
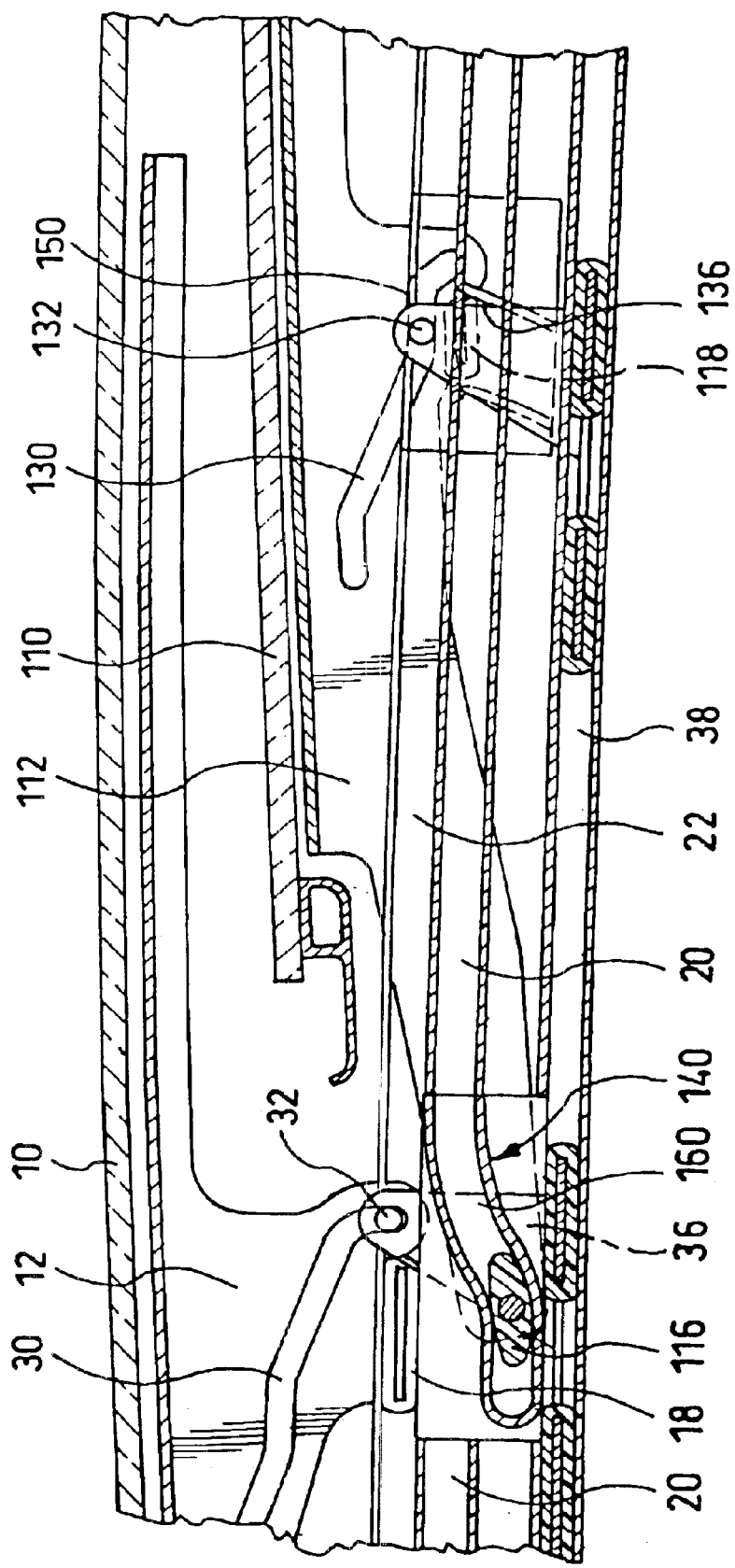
FIG. 6 is a view like that of FIG. 5, but showing the front cover completely raised and the rear cover almost completely raised.

In the position shown in FIG. 6, the front cover 10 is already completely raised and pushed a distance to the rear, while the rear cover 110 is not yet completely raised, i.e., no significant rearward displacement motion has occurred and the rear slide block 118 is still in the steep initial segment 124. The guide pin 132 is located in the essentially horizontally running segment 150 of the guide path 130.

Figure 7:
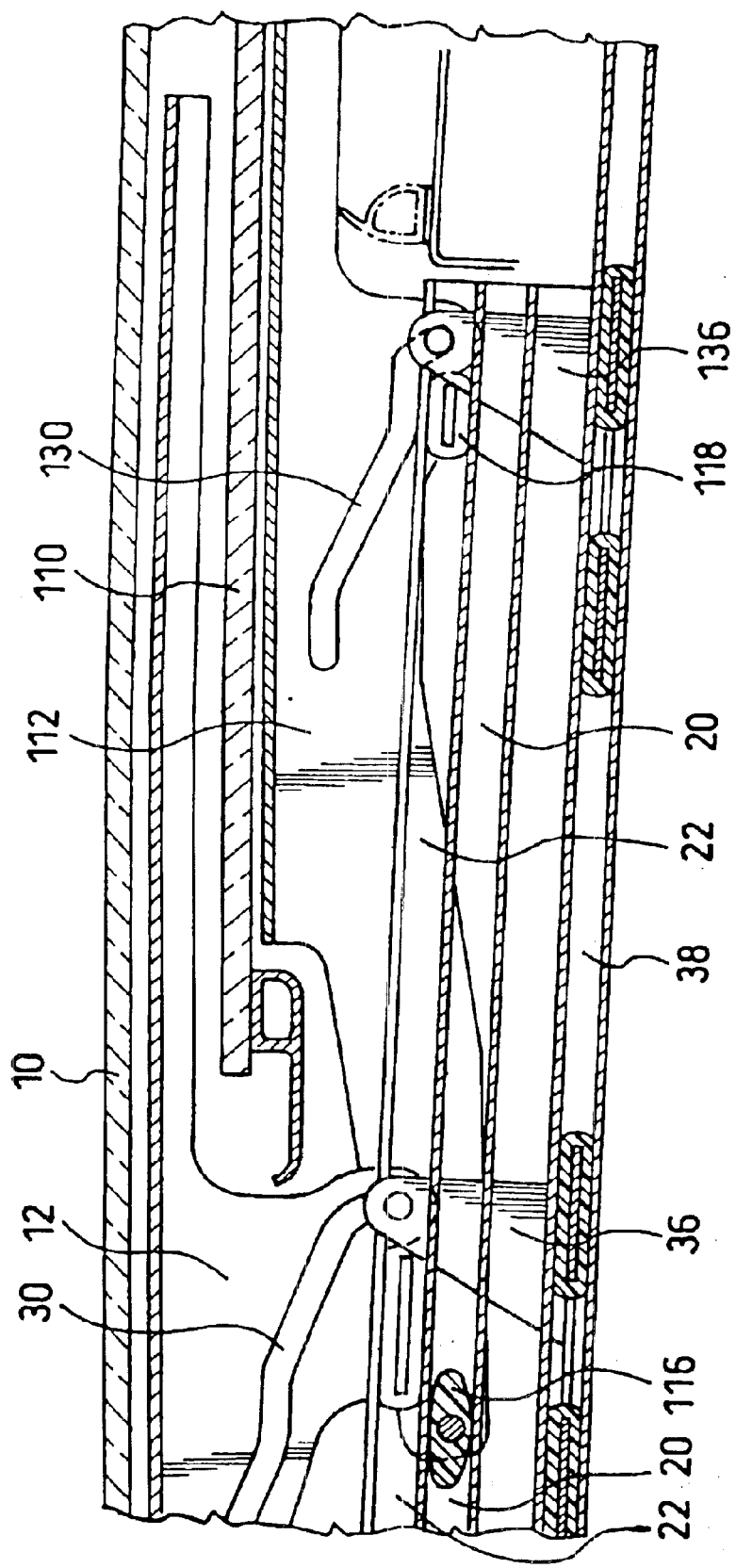
FIG. 7 is a view like that of FIG. 5, but showing the front and the rear covers completely raised and pushed back.

In the position shown in FIG. 7, the two covers 10, 110 are finally pushed completely to the rear.

For the rear cover, the back end of the guide path 130 is located behind the rear slide block 118, see FIGS. 5 to 7.

One important difference between the front cover 10 and the rear cover 110 is that the carriage 136 of the rear cover 110 is not driven by a drive cable. Instead, displacement of the carriage 136 takes place by the coupling to the carriage 36 of the front cover. Proceeding from the closed position of the two covers 10, 110, the two carriages 36, 136 are decoupled and only the carriage 36 of the front cover 10 is pushed to the rear, by which in the described manner first the raising motion of the front cover 10 and then displacement to the rear takes place. The rear cover 110 remains in its closed position. Only when the rear edge of the front cover 10 has been pushed a distance over the still closed rear cover 110 does coupling of the front carriage 36 to the rear carriage 136 take place, whereupon the two carriages are then pushed jointly to the rear for the remainder of the opening motion by the drive cable.

After coupling, first, the raising of the rear cover 110 takes place in the described manner, the front cover 10 being pushed farther to the rear. As soon as the rear slide block 118 of the rear cover leaves the steep initial area 124, for the rear cover 110 a displacement motion to the rear now begins; it proceeds jointly with the front cover 10. In the position shown in FIG. 7, finally the two covers are fully raised and pushed to the maximum degree to the rear. The covers 10, 110 are closed in the reverse sequence, the coupling between the two carriages 36, 136 being automatically released as soon as the rear cover 110 has reached its closed position again. The coupling mechanism can be made in the conventional manner, for example, by a locking block mechanism; see, for example, U.S. Pat. Nos. 5,335,961 and 5,484,185, or with a locking unit of the type disclosed in German Patent DE 100 09 387.

What is claimed is:

1. Openable motor vehicle roof, comprising:

at least one cover which closes at least part of a roof opening in a fixed roof in the closed position of the at least one cover;

first, second and third roof-mounted guides;

a carriage which is movable in a lengthwise direction of the roof in the first roof-mounted guide, the cover being raisable at its rear edge by rearward displacement of the carriage and being displaceable to the rear with the rear edge of the cover raised to clear the roof opening;

a cover-mounted cover carrier which is movably guided by a first sliding element in the second roof-mounted guide and a second sliding element which is offset to the rear relative to the first sliding element in the lengthwise direction of the roof in the third roof-mounted guide wherein the cover carrier is provided with a first guide path; the carriage has a first engagement element which is engaged in the first guide path; and wherein the guide path is configured in a manner causing a raising motion of the rear edge of the cover upon displacement of the carriage from the closed position.

2. Motor vehicle roof in accordance with claim 1, wherein the first guide path is adapted to provide vertical guidance of the rear edge of the cover during an initial opening phase and the third roof-mounted guide is adapted to provide vertical guidance of the rear edge of the cover after said initial opening phase.

3. Motor vehicle roof in accordance with claim 2, wherein the third roof-mounted guide is adapted to produce continued raising of the rear edge of the cover after said initial opening phase.

4. Motor vehicle roof in a accordance with claim 1, wherein the first guide path runs essentially vertically in a rear end segment thereof.

5. Motor vehicle roof in accordance with claim 4, wherein the first engagement element is adapted to contact the rear end segment of the first guide path in a manner pushing the cover, with it rear edge raised, rearward in the lengthwise direction of the roof.

6. Motor vehicle roof in accordance with claim 1, wherein the second sliding element, in the closed position of the cover, is adapted to engage the third roof-mounted guide by raising of the cover due to movement of the first engagement element in the first guide path, the second sliding element being disengaged from the third roof-mounted guide when the cover is lowered back into the closed position.

7. Openable motor vehicle roof, comprising:

at least one cover which closes at least part of a roof opening in a fixed roof in the closed position of the at least one cover;

first, second and third roof-mounted guides;

a carriage which is movable in a lengthwise direction of the roof in the first roof-mounted guide, to cover being raisable at its rear edge by rearward displacement of the carriage and being displaceable to the rear with the rear edge of the cover raised to clear the roof opening;

a cover-mounted cover carrier which is movably guided by a first sliding element in the second roof-mounted guide and a second sliding element which is offset to the rear relative to the first sliding element in the lengthwise direction of the roof in the third roof-mounted guide;

wherein to cover carrier is provided with a first guide path; the carriage has a first engagement element which is engaged in the first guide path; and wherein the guide path is configured in a manner causing a raising motion of the rear edge of the cover upon displacement of the carriage from the closed position, and wherein a second engagement element is provided on the cover carrier, the second engagement element being adapted to engage an essentially vertically running roof-mounted second guide during an initial phase of said raising motion in a manner essentially preventing displacement of the cover in the lengthwise direction of the roof.

8. Motor vehicle roof in accordance with claim 6, wherein the engaging of the second sliding element in the third roof-mounted guide is adapted to prevent displacement of the cover in the lengthwise direction of the roof until said raising motion is essentially completed.

9. Motor vehicle roof in accordance with claim 1, wherein the third roof-mounted guide runs essentially vertically at a front end area thereof.

10. Motor vehicle roof in accordance with claim 9, wherein the third roof-mounted guide runs essentially horizontally except at said front end area.

11. Motor vehicle roof in accordance with claim 1, wherein a front end area of the second roof-mounted guide is generally S-shaped in a manner acting to raise a front edge of the cover, and is essentially horizontal after said front end area.

12. Motor vehicle roof in accordance with claim 11, wherein the front edge of the cover is raised near an end of the raising motion.

13. Motor vehicle roof in accordance with claim 1, wherein the first, second, and third roof-mounted guides are part of a guide rail, the second and the third roof-mounted guide being located on opposite sides of the guide rail.

14. Motor vehicle roof in accordance with claim 13, wherein the first roof-mounted guide is lower than the third roof-mounted guide.

15. Motor vehicle roof in accordance with claim 1, wherein the second sliding element is mounted securely on the cover carrier and is elongated in the lengthwise direction of the roof.

16. Motor vehicle roof in accordance with claim 7, wherein said at least one cover comprises two covers which lie in succession, one behind the other, in the closed position of the roof, said covers jointly covering the roof opening, and wherein a respective first, second and third roof-mounted guides, a respective carriage which is movable in a lengthwise direction of the roof, and a respective first and second sliding element are provided for each cover.

17. Motor vehicle roof in accordance with claim 16, wherein part of the second and the third roof-mounted guides is used jointly by the both of the covers, and wherein another part of the second and the third roof-mounted guides is used solely by the rear cover, branching in the manner of a switch from the jointly used area.

18. Motor vehicle roof in accordance with claim 17, wherein the second sliding element of the front cover is longer in the lengthwise direction of the roof than the second sliding element of the rear cover to prevent entry of the second sliding element of the front cover into the front end area of the third roof-mounted guide which receives the second sliding element of the rear cover.

19. Motor vehicle roof in accordance with claim 17, wherein the second roof-mounted guide has an upper and a lower boundary wall which, in interplay, provide guidance for the first sliding element, the part which is used solely by the rear cover has a branching area that is directed downward, wherein a third sliding element is provided in association with the first sliding element, and wherein, in the branching area, the first and third sliding elements interact such that the first sliding element is guided along an inner side of the upper boundary wall and is prevented for entering the part which branches down by the third sliding element.

* * * * *